United States Patent [19]

Broadbent et al.

[11] 3,813,551

[45] May 28, 1974

[54] FIRE DETECTION APPARATUS

[75] Inventors: Arnold Broadbent; Peter Frost, both of Shaw, England

[73] Assignee: Talentum Developments Limited, Oldham, England

[22] Filed: Jan. 15, 1973

[21] Appl. No.: 323,507

[52] U.S. Cl. .......... 250/338, 340/227 R, 340/228 R

[51] Int. Cl. .......... G01j 5/00

[58] Field of Search .......... 250/338, 339, 340, 342, 250/372; 340/227 R, 228.1, 228.2

[56] References Cited

UNITED STATES PATENTS

| | | | |
|---|---|---|---|
| 3,147,380 | 9/1964 | Buckingham et al. | 250/338 |
| 3,315,244 | 4/1967 | Voigt et al. | 340/227 R |
| 3,443,124 | 5/1969 | Pinckaers | 340/227 R X |
| 3,501,652 | 3/1970 | Thomson | 340/228 X |

*Primary Examiner*—Archie R. Borchelt
*Attorney, Agent, or Firm*—Norris & Bateman

[57] ABSTRACT

The invention comprises an infra-red flame and spark fire alarm apparatus comprising an infra-red radiation detection cell the signals from which are amplified, and arrangements for decoupling the supply line to the cell and amplified by two current paths to reduce the effect of transient A.C. pulses, feeding the amplified signals at millivolt level through a sensitivity control to a low pass filter and to a two stage coupled amplifier to give a gain of the order of 2,500 and feeding the output from the amplifier to a diode limiter or clipping circuit, the square wave output from the limiter being fed to a diode integrator, and a bistable switch to operate at a minimum input voltage of 0.5v obtained by successive pulses from the diode integrator within a prescribed period, the triggering of the bistable switch causing current to flow to switch a thyristor shorting out a supply line and giving an alarm signal.

10 Claims, 5 Drawing Figures

FIRE DETECTION APPARATUS

This invention relates to improvements in flame and spark detection devices.

The object of the invention is to provide a sensitive and discriminating flame and spark detection device which will respond to infra-red radiation flickering at low frequency and discriminate against infra-red and light radiation flickering at about 100 Hz. and static infra-red radiation and also discriminate against transient voltage signals induced in an electronic control for the device from external sources other than the low frequency flickering of the flame or spark.

According to the invention a flame or spark detection apparatus comprises an infra-red radiation detector cell in a bridge circuit with a resistance, and means for feeding a signal into a high resistance amplifier to increase the signal and decrease the impedance of the cell to render the detached signal less sensitive to stray pick up, decoupling the supply lines to the cell and amplifier by two current paths to reduce the effect of transient A.C. pulses, feeding amplified signals at the millivolt level through a sensitivity control to a low pass filter and to a two stage capacitor coupled amplifier to give a gain in the order of 2,500, feeding the output from the amplifier to a diode limiter or clipping circuit, a square wave output from the limiter being fed to a diode integrator a bistable switch to operate at a minimum input voltage of 0.5v obtained by the addition of successive pulses from the diode integrator within a prescribed period, and the triggering of the bistable switch causing current to flow to switch a thyristor shorting out a supply line and giving an alarm signal.

Alternatively the apparatus comprises an infra-red radiation detector cell in a bridge circuit with a resistor feeding voltage to the inverting input of the first half of an integrated circuit, and amplified output at low frequency being fed to the inverting input of the second half of the integrated circuit, with means for chopping the output from the second half of the integrated circuit, amplifying the low frequency signals and feeding the output with the clipped signal through a capacitor for integration and the application of a time constant, the output signal being fed through a thyristor to operate an alarm device or being fed through a time delay potentiometer and in conjunction transversely to provide a time delay for the operation of the alarm device.

The invention will be described with reference to the accompanying drawings.

Figure 1:
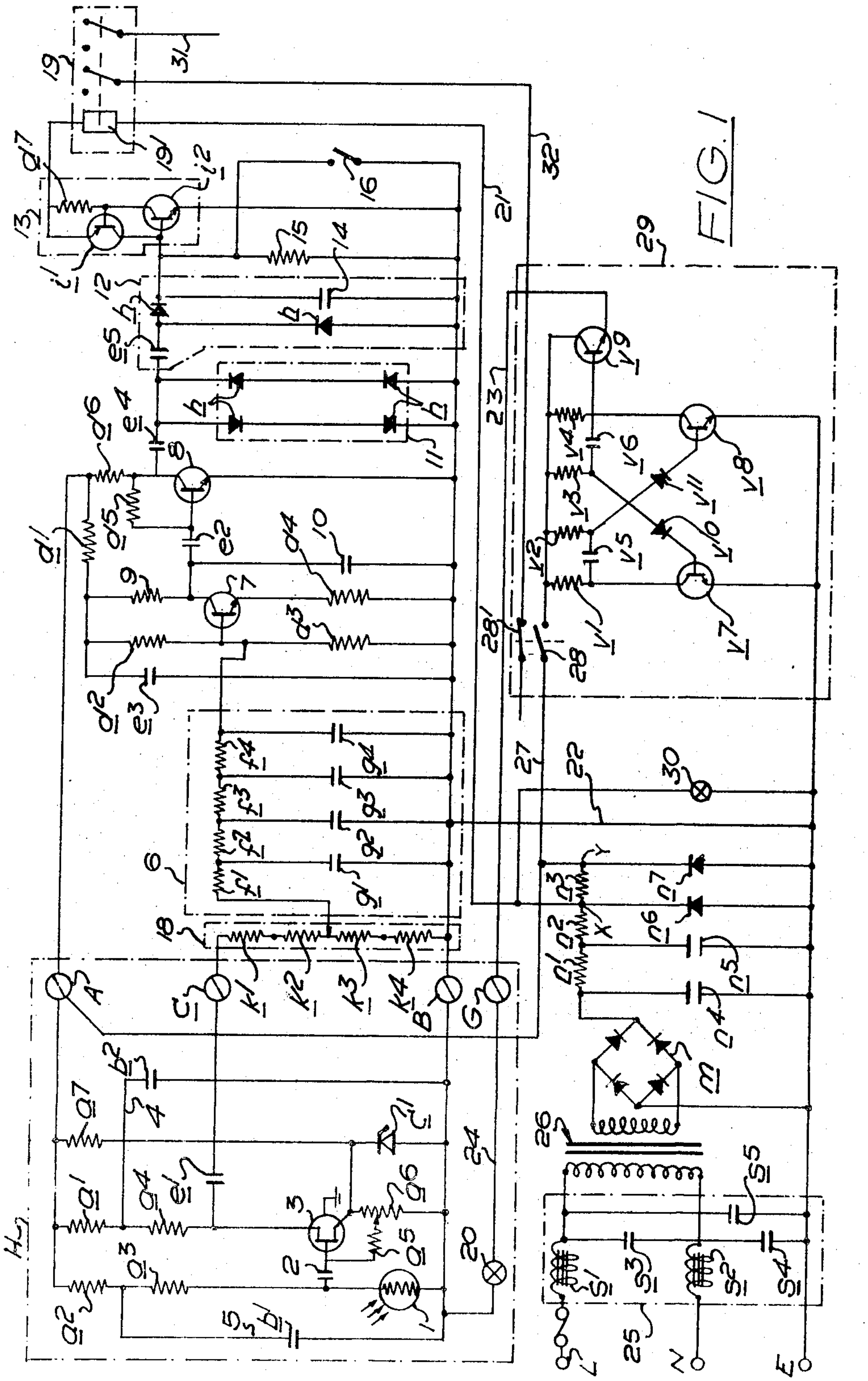
FIG. 1 is a circuit diagram showing an infra-red fire detection unit.

In the arrangement shown in FIG. 1 power is supplied to the circuit from a power pack which has terminals L and N connected to the mains supply, another terminal E at ground potential and comprises a suppressor 25 which includes a pair of chokes $S^1$, $S^2$, and a radio frequency filter network of capacitances $S^3$, $S^4$, $S^5$ of the balanced type to suppress the effect of mains switching transients. This filter is electrically screened from other components shown in the drawing. The power pack also includes a transformer 26 which steps down the voltage to a tenth of the mains voltage; a rectifier m; a smoothing network formed by resistor $n^1$ and capacitors $n^4$, $n^5$, and two cascade stages of reference diodes in which the first stage of resistor $n^2$ and zener diode $n^6$ has a stabilization ratio of 1:2; whilst the second stage of resistor $n^3$ and zener diode $n^7$ has a stabilization ratio of 1:30. The potential at junction X in the power pack is about 24 volts and about 18 volts at junction Y. When the power pack is supplying current, lamp 30 lights.

The chain dotted enclosure H denotes a section of the circuit and components in a detector head connected to a control circuit via terminals A, B, and C. Direct current at 18 volts is supplied to the detector head and control circuit from junction Y via terminal A. Terminal B is at ground potential connected to the power pack via current path 22.

An infra-red radiation detector cell 1 is of the lead sulphide photo-conductive type with a spectral response of between 1.5 to 3 microns. This cell can be a Mullard RPY76A with a peak response to radiation in the range of 2 to 2.3 microns and a cut off at 2.8 microns. Preferably, the head housing the cell is electrically screened. The cell is polarised from a 15v supply through a resistance network to maintain a quiescent voltage of about 7v across the cell. The cell which has a resistance of about 300 K ohms is connected to a high impedance amplifier of the low noise, field effect transistor type. The field effect transistor, which is earthed, is shown at 3 and a capacitor coupling the output from the cell to the transistor is shown at 2. This amplifier increases the signal and decreases the impedance of the cell 1 so as to render the detected signal less sensitive to stray pick up. The supply line is decoupled by two current paths 4 and 5 which include a capacitor $b^1$ and $b^2$ respectively which reduce the effect of transient A.C. pulses and/or feedback by shunting A.C. components to the negative line.

The main amplifier and control circuit connected to head H via terminals A, B, C may be housed with the powerpack. Amplified signals at the millivolt level are fed via sensitivity control 18 to a high rejection low pass filter 6 of the cascade RC type designed to attenuate all input signals about 50 Hz. The degree of attenuation increases with increase in frequency and is large, about 40 decibels, at 100 Hz which is the frequency of flicker of lights powered by the mains and very large at 200 Hz which is the first harmonic of mains flicker which can be picked up if the cell 1 is positioned close to such lights.

A two stage capacitor coupled amplifier which includes two n.p.n. transistors 7 and 8 is connected to filter 6 and is arranged to give a gain of the order of 2,500 for input signals of frequencies up to the order of 10 Hz. which has been selected as the upper limit of the range of most likely flicker frequency of a flame or spark at the commencement of or during a fire. Resistance 9 and capacitance 10 are of selected magnitude for the gain of the amplifier to drop considerably for signals in excess of 20 Hz (cut off frequency) and for the amplifier to have a 6db/octave roll-off above 20 Hz, that is, the voltage gain for signals in excess of 20 Hz is reduced by a factor of one half per each doubling of the frequency of the signal in excess of 20 Hz. Thus the voltage gain for a signal of 80 Hz is only half of the gain at 40 Hz which is itself only half of the gain at 20 Hz. As stated, optimum amplification occurs for signals in the range up to 10 Hz and this limitation of band width reduces the effect of noise.

The output of the amplifier is applied to a diode limiter or clipping circuit indicated at 11. This clipping circuit comprises four diodes *h* connected for positive and negative clipping of the amplified signal from the amplifier so as to limit the maximum peak to trough output voltage to about 2.8v. (It has been found that this maximum output signal from the diode limiter can be obtained from a flickering radiation source at 800° C having an area of 4 sq. mm. at a distance of 1m. from the cell 1). The clipping means is arranged to limit any signal therefore to X volt and the integrating means has an alternative ratio of 1:2 where Z exceeds zero and the voltage Y is less than 3K/22.

Now the square wave output from the diode limiter 11 is fed to a simple diode pump integrator 12 which has an attenuation ratio of about 5:1. Thus the voltage of each signal fed into the pump is reduced to a fifth of its original value. Since the maximum input signal into the pump integrator cannot exceed one-half of 2.8v, i.e., 1.4v, the maximum output of a single signal from the pump cannot exceed 1.4/105 or 280 mv.

When switch 13 is triggered a coil 19$^1$ of a relay 19 is energised to operate the relay which actuates alarm means (not shown) such as a bell or siren and a signal lamp (not shown) to indicate cell 1 has detected flame and, if desired, fire extinguishing apparatus (not shown) to introduce suitable fire exinguishing chemicals, for example ammonium phosphate powder, into the region scanned by the cell 1. The current supply to the coil 19$^1$ is at 24v via current path 21 from junction X.

The alarm means and signal lamp are preferably powered by mains current via a current path 31 connected to a set of contacts in the relay 19. If fire extinguishing means is provided this is also powered by mains current via current path 32 from another set of relay contacts.

After switch 13 has been triggered the device can be reset by making the normally open switch 16.

It will be understood that the device only operates the relay 19 when the frequency of flame flicker is at least 3Hz. and if at least one of the output signals from the pump 12 is much less than 140 mv. the frequency of flame flicker must be in excess of about 3Hz. if the device is to operate. However the device is very sensitive to flames which may reasonably be said to indicate a fire. Since the radiation from a match flame or cigarette lighter, etc., can operate the device it also has application in crime detection, for example inside or adjacent to strongrooms and safes.

A list of suitable components for the detector head circuit and control circuit is as follows:

| | |
|---|---|
| Resistance $a^1$ | 4.7 K ohms |
| $a^2$ | 100 K ohms |
| $a^3$ | 220 K ohms |
| $a^4$ | 22 K ohms |
| $a^5$ | 10 K ohms |
| $a^7$ | 10 K ohms |
| Capacitor $b^1$ | 100 Micro F |
| $b^2$ | 50 Micro F |
| 2 | 0.022 Micro F |
| $c^1$ | 50 Micro F |

Detector cell 1 is a Mullard PRY 76A

-Continued

Field effect transistor 3 is a Mullard BFW10
Zener Diode $c^1$ is a ZF6.2
Resistances $k^1$, $k^2$, $k^3$, $k^4$ each 12 K ohms

| | |
|---|---|
| Resistance $d^1$ | 3.9 K ohms |
| $d^2$ | 270 K ohms |
| $d^3$ | 22 K ohms |
| $d^4$ | 220 ohms |
| $d^5$ | 470 K ohms |
| $d^6$ | 10 K ohms |
| $d^7$ | 10 M ohms |
| 9 | 10 K ohms |
| 15 | 1.0 M ohms |

Resistances $f^1$, $f^2$, $f^3$, $f^4$ each 4.7 K ohms

| | |
|---|---|
| Capacitor $e^2$ | 50 micro F |
| $e^3$ | 100 micro F |
| $e^4$ | 0.1 micro F |
| $e^5$ | 0.1 micro F |
| 10 | 1.0 micro F |
| 14 | 1.0 micro F |

Capacitances $g^1$, $g^2$, $g^3$, $g^4$ each 1.0 micro F
Transistors 7 and 8 are each of ZTX 107
Diodes *h* are each ITT 2002
Transistor $i^1$ is a ZTX 503
Transistor $i^2$ is a ZTX 107

Suitable values for the components of the power pack are as follows:

| | |
|---|---|
| Chokes $S^1$ and $S^2$ | 6 micro H each |
| Capacitor $S^3$ | 0.0047 micro F |
| $S^4$ | 0.0047 micro F |
| $S^5$ | 0.01 micro F |
| Transformer 26 | 240/24 volts. 0.25 Amps. |
| Rectifier M is a BS2 | |
| Resistance $n^1$ | 12 ohms 1 Watt |
| $n^2$ | 68 ohms 1 Watt |
| $n^3$ | 680 ohms 0.5 Watts |
| Capacitance $n^4$ | 1250 micro F |
| $n^5$ | 1250 micro F |

Zener Diode $n^6$ is a VR24F 24 volts 2 Watts.
Zener Diode $n^7$ is a BZX61/C18 18 volts 1 Watt
Signal lamp 30 0.04 amps. 24 volts.

The cell 1 may be mounted in a bore in a metal end cap formed, for example, of aluminum provided with a window over the bore to allow radiation to impinge on the cell. This end cap is fitted into a hollow tube also, for example, of aluminum which is closed at its other end.

Th circuit (included within the chain dots H) may be contained within the tube and may comprise a printed circuit. Also the control circuit may, if desired be contained within the tube and may also be a printed circuit.

Preferably the cell is disposed so that it may scan a region lying within a cone of an angle of about 160° with the cell at the cone apex, but fire can be detected out of direct view of the cell by virtue of infra-red radiation reflected from walls and other surfaces.

The apparatus can be used to detect fire in machinery, for example in filters for removing textile or other inflammable waste from a stream of air. In one such filter a cylindrical revolving cage comprises a metal mesh exterior upon which a blanket of waste matter builds up as the air passes through the mesh into the cage interior. The air leaves the interior through an opening at one end of the cage. This opening leads directly into a duct aligned with the cage, and the detector may be mounted on struts inside the duct to scan the whole interior of the cage for an outbreak of fire. A fire extinguisher automatically operated by the fire detector can be mounted to discharge into the filter to extinguish the fire.

To determine easily whether the device is functioning correctly a test circuit is provided to flash a lamp 20 positioned close to the cell 1. This lamp is flashed at a frequency in the range of 10 Hz to 3 Hz when it is desired to test the detector which if functioning correctly triggers the switch 13.

The test circuit comprises a multivibrator 29 powered from the 18v supply of the power pack. The output of the multivibrator is applied to the lamp 20 via current path 23, terminal G and current path 24. Power is only supplied to the multivibrator when a key operated switch 28 is made which automatically breaks switch $28^1$ to interrupt path 32. When the output from the multivibrator is applied to lamp 20, the lamp flashes and switch 13 is triggered to operate the relay 19. The alarm means in line 31 is operated but the fire extinguishing means in interrupted line 32 is not. When testing is finished the switch 28 is broken. This automatically makes switch $28^1$ again to permit operation of the fire extinguishing means should the device detect a fire.

Suitable values for the components of the multivibrator are as follows:

| | |
|---|---|
| Resistance $V^1$ | 3.3 K ohms |
| $V^2$ | 470 K ohms |
| $V^3$ | 470 K ohms |
| $V^4$ | 3.3 K ohms |
| Capacitance.$V^5$ | c.1 micro F |
| $V^6$ | 1.0 micro F |

Transistors $V^7$, $V^8$, $V^9$ each a ZTX 107
Diodes $V^{10}$, $V^{11}$ each a ITT.2002.

Figure 2:
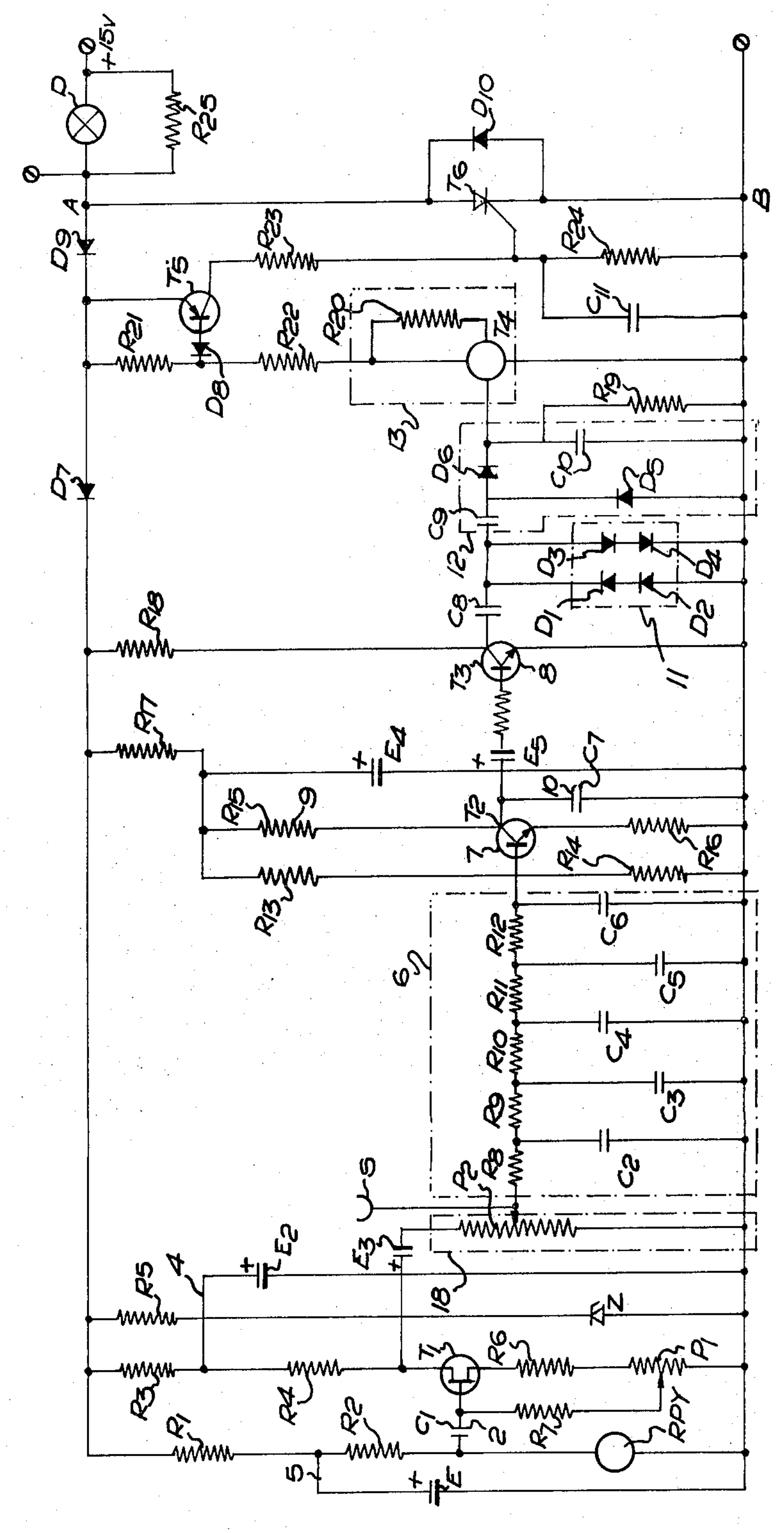
FIG. 2 is a circuit diagram showing a further infra-red fire detection circuit.

In the alarm circuit shown in FIG. 2 an infra-red radiation detector cell RPY is employed of the lead sulphide photoconductive type with a spectral response of between 1.5 and 3 microns. This cell may be a Mullard RPY76A with a peak response to radiation in the range of 2 to 2.3 microns and a cut off at 2.8 microns. Preferably, the head housing the cell is electrically screened. The cell is polarised from a 15v supply through resistance network to maintain a quiescent voltage of about 7.5v across the cell. The cell has a resistance of about 300 K ohms is connected to a high impedance amplifier of the low noise, field effect transistor type 3. The field effect transistor T1, is earthed, and a capacitor coupling the output from the cell to the transistor is shown at 2. This amplifier increases the signal and decreases the impedance of the cell so as to render the detected signal less sensitive to stray pick up. The supply line is decoupled by two current paths 4 and 5 which include a capacitor E and $E^2$ respectively which reduce the effect of transient A.C. pulses and/or feedback by shunting A.C. components to the negative line.

The main amplifier 3 and control circuit are connected to the head detector. Amplified signals at the millivolt level are fed via sensitivity control 18 to a high rejection low pass filter 6 of the cascade RC type designed to attenuate all input signals above about 50 Hz. The degree of attenuation increases with increase in frequency and is large, about 40 decibels, at 100 Hz which is the frequency of flicker of lights powered by the mains and very large at 200 Hz which is the first harmonic of mains flicker which can be picked up if the cell RPY is positioned close to such lights.

A two stage capacitor coupled amplifier which include two n.p.n. transistors 7 and 8 is connected to filter 6 and is arranged to give a gain of the order of 2,500 for input signals of frequencies up to the order of 10Hz. which has been selected as the upper limit of the range of most likely flicker frequency of a flame or spark at the commencement of/or during a fire. Resistor 9 and capacitor 10, are of selected magnitude for the gain of the amplifier to drop considerably for signals in excess of 20 Hz. (cut off frequency) and for the amplifier to have a 6db octave roll-off above 20 Hz, that is the voltage gain for signals in excess of 20 Hz, is reduced by a factor of one-half per each doubling of the frequency of the signal in excess of 20 Hz i.e. the voltage gain for a signal of 80 Hz. is only half of the gain at 40 Hz. which is itself only half of the gain at 20 Hz. As stated, optimum amplification occurs for signals in the range up to 10 Hz. and this limitation of band width reduces the effect of noise.

The output of the amplifier is applied to a diode limiter or clipping circuit indicated at 11. This clipping circuit comprises four diodes D1, D2, D3, D4 connected for positive and negative clipping of the amplified signal from the amplifier so as to limit the maximum peak to trough output voltage to about 2.8V. (It has been found that this maximum output signal from the diode limiter can be obtained from a flickering radiation source at 800° C having an area of 4 sq. mm. at a distance of 1m from the cell RPY).

The square wave output from the diode limiter 11 is fed to a simple diode pump integrator 12 which has an attenuation ratio of about 5.1. Thus the voltage of each signal fed into the pump is reduced to a fifth of its original value. Since the maximum input signal onto the pump integrator cannot exceed one half of 2.8, i.e., 1.4v, the maximum output of a single signal from the pump cannot exceed 1.4 volts or 280 mv.

A p-n-p-n bistable switch 13 is arranged to operate when an input voltage of 0.5v or more is applied to it. This voltage is achieved by successive output signal from the pump 12 being added together until 0.5v is achieved. However, this must occur within a given time constant of or about one second derived from the magnitudes of capacitor 14 and resistance 15 otherwise the delay of the integrated output of the pump 12 will reduce the voltage, and the triggering value of 0.5v will not be achieved. If, for example, three maximum output pulses of 280mv from the pump occur within 1 second the summated voltage from the integrator is about 1.0V which is sufficient to trigger the switch 13.

When the switch 13 is triggered a transistor T5 is switched on causing a current to flow into the gate of a thyristor T6 thereby switching on the thyristor and shorting out the supply line AB and causing a bulb D to light thereby increasing the current drawn by the device from 2 mA to 300 mA. A second bulb in parallel with the first bulb may be provided to give a remote indication of the operation of the device and to indicate which of a plurality of flame detectors has been operated. The device is reset by removing the supply. A resistor R25 across the bulb is included so that if the bulb fails a large current is still drawn. Diodes D7, D8, D9 and capacitor C11 are included to facilitate resetting of the device by preventing any reverse currents.

A list of suitable components for the circuit is as follows:

| | |
|---|---|
| E=150 micro F Electrolytic | (2) C=0.022 F |
| E2=50 micro F Electrolytic | $C_2=C_3=C_4=C_5=C_6=C_7=1.0$ micro F |
| E3=40 micro F Electrolytic | |
| E4=150 micro F Electrolytic | $C_8=C_9=0.33$ micro F |
| E5=40 micro F Electrolytic | (14) $C_{10}=1.5$ micro F |
| R=100 K ohms | |

$R_2$=Matched to resistance of cell under ambient conditions
$R_3$=10 K ohms
$R_4$=22 K ohms
$R_5$=22 K ohms
$R_6$=10 K ohms
$R_7$=10 K ohms
$R_8$=$R_9$=$R_{10}$=$R_{11}$=$R_{12}$=4.7K ohms
$R_{13}$=270 K ohms
$R_{14}$=22 K ohms
$R_{15}$=10 K ohms
$R_{16}$=220 K ohms
$R_{17}$=3.9 K ohms
$R_{18}$=10 K ohms
$R_{19}$=1 K ohms
$R_{20}$=10 K ohms
$R_{21}$=4.7 K ohms
$R_{22}$=1 K ohms
$R_{23}$=1 K ohms
$R_{24}$=4.7 K ohms
$R_{25}$=47 K ohms
$P_1$=10 K ohms Potentiometer
$P_2$=47 K ohms
$T_1$=Mullard BFW10 FET
$T_2$=$T_3$=FERRANTI ZTX107
$T_4$=Mullard BRY39 Silicon Switch
$T_5$=Mullard BCY30
$T_6$=AEI CRIO51C Thyristor
Z=Mullard BZY88 C6V21.6.2V Zener diode
D1–D10=I.R. IODI
Cell RPY=Mullard RPY76A
Bulb=Vitality T=1¾ 6mm Tubular midget Flange No. 724 6 volt. 2 Amps.

A sensitivity calibration socket is connected to the slider of the sensitivity control P2.

Figure 3:
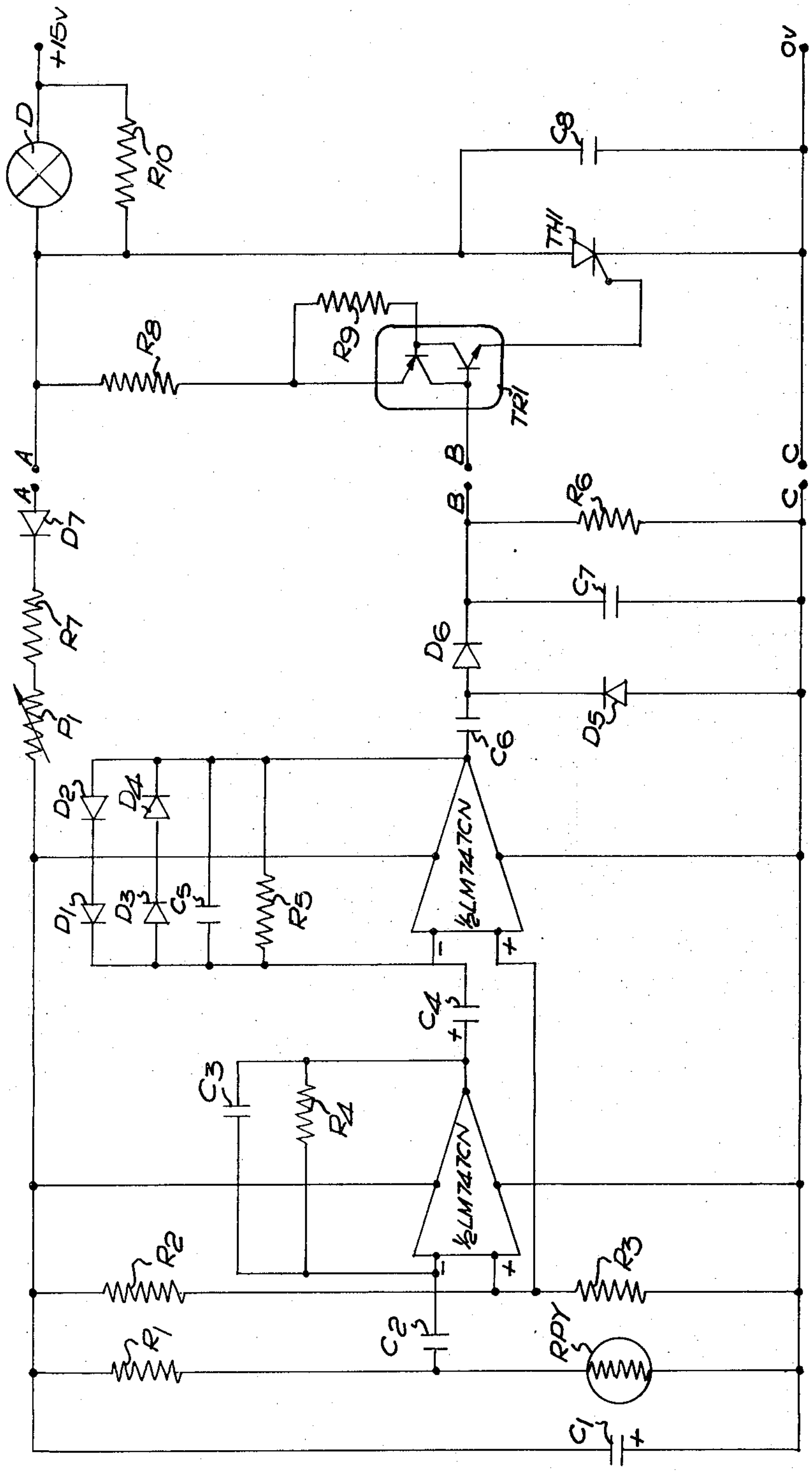
FIG. 3 is a circuit diagram of a still further circuit.
Figure 4:
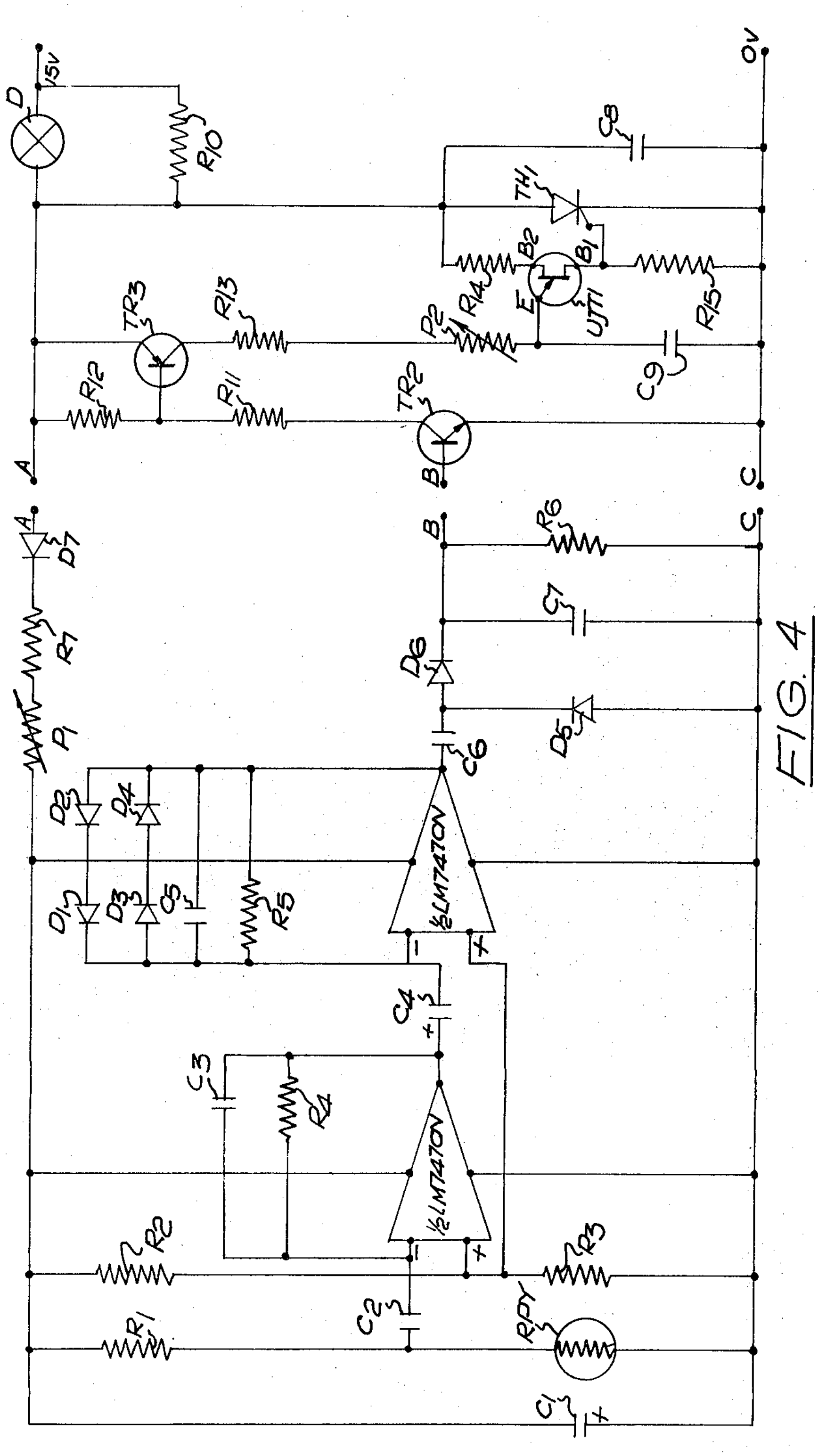
FIG. 4 is an alternative circuit to that shown in FIG. 3 providing a time lag for the operation of the alarm.
Figure 5:
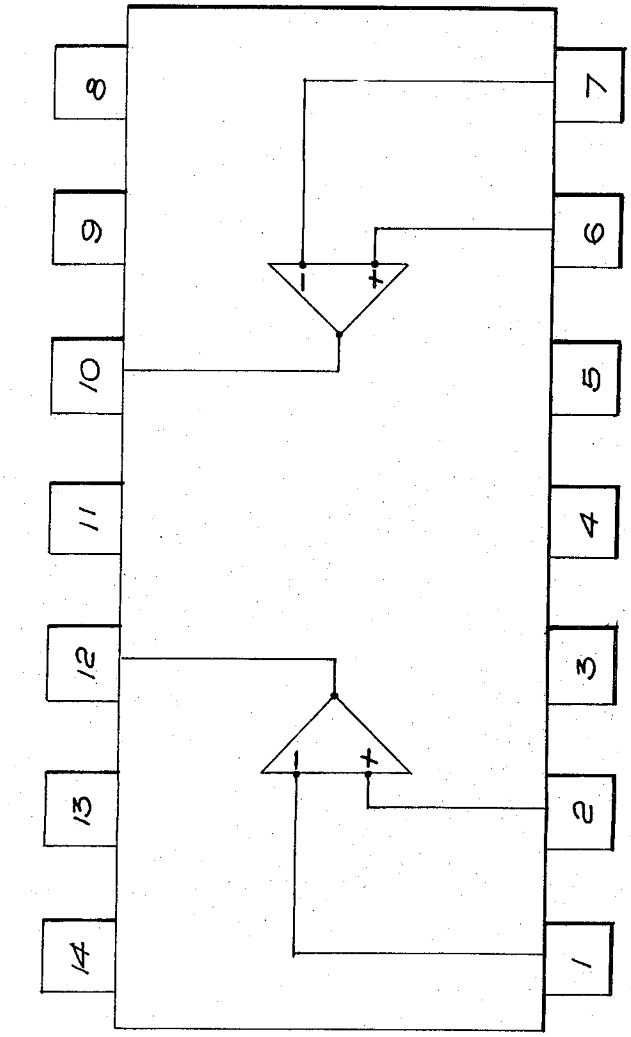
FIG. 5 is a detail view of the integrated circuit LM747CN.

The fire alarm detector circuit shown in FIGS. 3-5 incorporate a dual in line (DIL) integrated circuit such as a National LM747CN (shown in FIG. 4) which comprises two fully compensated operational amplifiers in a single package.

The circuit operates from an infra-red detection cell RPY. Voltage from a resistor R1 and the cell RPY bridge is fed via capacitor C2 into the inverting input of the first half of the integrated circuit LM747CN. Amplified output at low frequency, due to feedback via capacitor C3 and resistor R4, is fed into the inverting input of the second half of the integrated circuit via capacitor C4. Capacitors C2 and C4 are blocking capacitors allowing only AC signals to pass. Again only low frequency signals are amplified due to the feedback of capacitors C5 and resistor R5. The output of the second half of the integrated circuit is chopped to 2.8 volts peak to peak by means of the four diodes D1, D2, D3 and D4 connected for positive and negative clipping. The AC signal now obtained and the clipped to 2.8V peak to peak is fed through a capacitor C6 and is integrated by diodes D5 and D6 and capacitor C7. A resistor R6 provides a time constant of one second to ensure that at least three pulses are required in one second to produce an output voltage at B of 500 mV. A potentiometer P1 acts as a sensitivity control. A resistance R7 and capacitor C1 prevent line transient voltages affecting the device. The diode D7 prevents any reverse flow of current.

The circuit may operate in combination with a circuit to provide instantaneous operation on picking up any infra-red radiation as shown in FIG. 2 or may be used in combination with a time delay circuit as shown in FIG. 3 controlled to operate after a predetermined interval of time, to prevent operation if the infra-red radiation is only transient.

For instantaneous operation as shown in FIG. 3 the output signal from terminal B is fed into the gate of transistor switch TR1 which is stabilised by a resistance R9 and loaded with a resistance R8. The transistor switch TR1 is used to switch a thyristor TH1. A capacitor C8 stabilises the thyristor TH1 and prevents voltage surges switching the thyristor. When the thyristor TH1 switches the circuit through an indicator bulb D in parallel with a resistor R10 from a positive supply + (16 volts) to negative terminal O is completed. This considerable increase in current drain is detected at a control panel connected to the positive terminal + and the negative terminal O and is used to operate an alarm signal. The control panel under alarm conditions reduces the supply voltage to the detector to 6 volts.

When operative with a time delay as shown in FIG. 4 the output signal from terminal B is fed into the base of a transistor TR2 which in turn switches a transistor TR3. When the transistor TR3 is switched, current flows through a resistor R13 and a time delay adjustment potentiometer P2 to charge a capacitor C9. If the 500 mV signal from B is maintained or occurs frequently enough, then the capacitor C9 is charged to the peak voltage of a unijunction transistor UJT1 which then imparts a triggering pulse onto the gate of the thyristor TH1. From thereon the circuit operates as described in FIG. 1. If the 500 mV signal at terminal B does not persist long enough or occur frequently enough, then the voltage at the emitter of the unijunction transistor UJT1 decays with the time constant of approximately 20 seconds due to the leakage through the capacitor C9 and the unijunction transistor UJT1, thereby ensuring that if the modulated infra-red radiation falling on the cell does not persist for the predetermined interval of time then no alarm is given.

The following components used in the foregoing circuits are formed to provide satisfactory circuits:
Cell RPY — Mullard RPY 76A
Integrated Circuit — National LM747 Cn dual in line
Transistor TR1 — Mullard BRY 39
Transistor TR2 — Mullard BC 109
Transistor TR3 — Mullard BCY 71
Transistor UJT1 — Motorola 2N4870
Thyristor TH1 CT1/051C
Diodes D1–D7 — Mullard In4001
Resistors R1 — Welwyn MR 5 (matched to resistance of RPY 76A Cell)
Resistors R2–R9 and R11–R15 — Mullard Cr25
Resistor R10 — Welwyn W21
Potentiometers P1 and P2 — Plessey MPD
Capacitors C1 — Mullard C428AR/G150
Capacitors C2–C7 — ITT TAG Tantalum
Capacitors C8 — Mullard 344
Indicator bulb — 6V 0.15A.

The apparatus may be employed as a smoke and flame detector by connecting the device in parallel with a smoke detector both being supplied from a 15 volt control box.

The cell 1 may be mounted in a bore in a metal end cap formed, for example, of aluminum provided with a window over the bore to allow radiation to impinge on the cell. This end cap is fitted into a hollow tube also for example, of aluminum which is closed at its other end. The circuit may be contained within the tube and may comprise a printed circuit.

Preferably the cell is disposed to scan a region lying within a cone of an angle of about 160° with the cell at the cone apex, but fire can be detected out of direct view of the cell by virtue of infra-red radiation reflected from walls and other surfaces.

The device can be used to detect fire in machinery, for example in filters for removing textile or other inflammable waste from a stream of air. In one such filter a cylindrical revolving cage comprises a metal mesh exterior upon which a blanket of waste matter builds up as the air passes through the mesh into the cage interior. The air leaves the interior through an opening at one end of the cage. This opening leads directly into a duct aligned with the cage, and the detector may be mounted on struts inside the duct to scan the whole interior of the cage for an outbreak of fire.

The advantage of the present arrangement is that the flame detector can be operated from a smoke detector control box and the additional current passing through the circuit on operation of anyone of a plurality of flame detection is available for actuating alarm devices.

The time delay is intended for use in public buildings where smoking is permitted and where because of the time delay will be prevented from operating the apparatus. Where there is no possibility of sources of infrared radiation other than from a fire, the detector without time delay is preferred owing to its faster response. Such an application would be a computer room.

Both arrangements in FIG. 4 and 5 with and without time delay, are interchangeable with the original design FIG. 1 or 2.

What we claim is:

1. An infra-red flame and spark fire alarm apparatus comprising an infrared radiation detection cell in a bridge circuit with a resistance, means for feeding a detected signal into a high resistance amplifier to increase the signal and decrease the impedance of the cell to render the detected signal less sensitive to stray pick up, decoupling the supply line to the cell and amplifiers by two current paths to reduce the effect of transient AC pulses, feeding amplified signals at the millivolt level through a sensitivity control to a low pass filter and to a two stage capacitor coupled amplifier to give a gain in the order of 2,500, and feeding the output from the amplifier to a diode limiter or clipping circuit, means feeding a square wave output from the limiter to a diode integrator, and a bistable switch adapted to operate at minimum input voltage of about 0.5v connected to receive successive pulses from the diode integrator within a prescribed period, and means responsive to triggering of the bistable switch for actuating an alarm signal.

2. An infra-red flame or spark fire alarm comprising an infra-red radiation detector cell in a bridge circuit with means feeding voltage corresponding to detected radiation to the inverting input of the first half of an integrated circuit, means whereby an amplified output at low frequency is fed to the inverting input of the second half of the integrated circuit, means chopping the output from the second half of the integrated circuit, and means for amplifying the low frequency signals and feeding the output with the clipped signal through a capacitor for integration and the application of a time constant, the output signal being fed to a thyristor which when switched operates an indicator to give an alarm signal.

3. An infra-red flame or spark fire alarm as in claim 2 in which the output from the integrator is fed to a transistor which when switched feeds a time delay adjustment potentiometer and a unijunction transistor and if the signals persist for a predetermined time the alarm signal is operated.

4. A flame or spark detection apparatus as in claim 1 said cell comprising a photo-conductive cell responsive only or mainly to infra-red radiation to emit an electrical signal in response to such radiation incident on the cell, first amplifier means to amplify the signal, an electrical filter network to substantially eliminate from the signal frequencies above about 50 Hz and block any DC signals due to a source of static infra-red radiation, second amplifier means to amplify signals of frequencies up to about 10 Hz by the greatest amount, and have a cut off point at about 20 Hz the signals of a frequeny in excess of about 20 Hz are being either not amplified or being amplified to a much lesser extent by the second amplifier, voltage clipping means to limit the maximum voltage of signals from the second amplifier to a desired value, voltage integrating means for adding together the output voltages of successive signals so that should the summated output voltage for the integrator exceed a given triggering value within any period of about one second this output triggers operation of warning means and fire extinguishing means, but said clipping means, integrating means and triggering means being arranged such that the triggering voltage is not reached if the frequency of the signal input to the integrating means is less than about 3 Hz.

5. A flame or spark detection apparatus as claimed in claim 1 in which the warning means is operable in response to triggering of bistable switch means arranged to operate when a voltage $y$ is applied thereto, the clipping means is arranged to limit the maximum peak to trough voltage to any signal therefrom to $x$ volts, the integrating means has an attenuation ratio of $1:z$ where $z$ exceeds zero, and the voltage $y$ is less than $3x/2z$

6. A flame or spark detection apparatus as in claim 4 in which $y$ is about 0.5 volts, $x$ is about 2.8 volts and $z$ is equal to 10.

7. A flame or spark detection apparatus as claimed in claim 4 in which the filter network is of the RC cascade type arranged to attenuate the voltage of signals applied thereto above about 30 Hz said network being arranged such that the degree of attenuation increases the higher the frequency of the applied signals.

8. A flame or spark detection apparatus as claimed in claim 4 in which the filter network is arranged so that the attenuation of the voltage of a signal applied thereto of a frequency of about 100 Hz is of the order of 40 decibels.

9. A flame or spark detection apparatus as claimed in claim 4 in which second amplifier means is arranged for the gain thereof to have a 6 decibels per octave roll-off for signals applied thereto of a frequency above about 20 Hz.

10. The apparatus defined in claim 1, wherein said alarm actuating means comprises a thyristor operatively connected to said supply line.

* * * * *